United States Patent
Doshi

(10) Patent No.: US 7,737,408 B2
(45) Date of Patent: Jun. 15, 2010

(54) MONOLITHIC SCINTILLATORS WITH OPTICAL FIBER READ-OUT

(75) Inventor: Niraj K. Doshi, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 420 days.

(21) Appl. No.: 11/782,133

(22) Filed: Jul. 24, 2007

(65) Prior Publication Data

US 2009/0026375 A1  Jan. 29, 2009

(51) Int. Cl.
*G01T 1/202* (2006.01)
(52) U.S. Cl. .................. 250/368; 250/367; 250/370.11
(58) Field of Classification Search ............ 250/370.09, 250/370.11, 367, 368, 369
See application file for complete search history.

(56) References Cited

U.S. PATENT DOCUMENTS

2004/0200966 A1* 10/2004 Ramsden ............... 250/367
2004/0262526 A1* 12/2004 Corbeil et al. ............. 250/367

FOREIGN PATENT DOCUMENTS

WO  WO 2007011214 A1 * 1/2007

OTHER PUBLICATIONS

D. Gagnon; et al., Maximum Likelihood Positioning in the Scintillation Camera Using Depth of Interaction, IEEE Tranasctions on Medical Imaging, vol. 12, No. 1, Mar. 1993, pp. 101-107.

* cited by examiner

*Primary Examiner*—David P Porta
*Assistant Examiner*—Mark R Gaworecki
(74) *Attorney, Agent, or Firm*—Peter L. Kendall

(57) ABSTRACT

A scintillation detector according to an embodiment of the invention features a monolithic scintillation crystal and a plurality of optical fibers coupled to the scintillation crystal. The optical fibers are arranged to convey scintillation light to an optical sensor that is located exterior to the scintillation crystal. Because the optical fibers are extremely small in diameter, a multiplicity of them can be coupled to the scintillation crystal to provide the extremely high resolution of a pixelated scintillation crystal while the comparative manufacturing simplicity of a monolithic scintillation crystal is maintained. In preferred embodiments, the optical fibers are further arranged so that depth of interaction information can be obtained.

15 Claims, 3 Drawing Sheets

MONOLITHIC SCINTILLATORS WITH OPTICAL FIBER READ-OUT

TECHNICAL FIELD

In general, the invention relates to nuclear medical imaging. More particularly, the invention relates to gamma radiation detectors used, for example, in positron emission tomography (PET) scanning.

BACKGROUND OF THE INVENTION

In PET imaging, positrons are emitted from a radiopharmaceutically doped organ or tissue mass of interest. The positrons combine with electrons and are annihilated and, in general, two gamma photons which travel in diametrically opposite directions are generated upon that annihilation. Opposing crystal detectors, which each scintillate upon being struck by a gamma photon, are used to detect the emitted gamma photons. By identifying the location of each of two essentially simultaneous gamma interactions as evidenced by two essentially simultaneous scintillation events, a line in space along which the two gamma photons have traveled (a "line of response," or "LOR") can be determined. The LORs associated with many million gamma interactions with the detectors are calculated and "composited" to generate an image of the organ or tissue mass of interest, as is known in the art.

Some of the earlier PET systems used monolithic scintillation detectors—i.e., detectors that were each made from a single, unitary crystal element—and photosensor elements (e.g., photomultiplier tubes (PMT's) or avalanche photodiodes (APD's)) coupled to them to detect the incoming gamma rays and generated scintillation photons, respectively. In such systems, the resolution of the system—i.e., the ability to localize the interaction event—was limited by the size and hence "packing" or "clustering" ability of the photosensor elements. Therefore, to improve the resolution, subsequent systems were constructed with pixelated scintillation detectors, i.e., detectors that were comprised of a multitude of much smaller, cubic scintillation elements. Because the scintillation elements were so much smaller than the photosensors, the gamma interaction and scintillation photon generation could be localized with much better accuracy. Fabricating pixelated scintillation detectors is, however, relatively labor intensive, and there is a limit to how small the scintillation elements could be made.

Furthermore, the known pixelated gamma detectors typically could be used only to determine the location of gamma interaction with the detector in two dimensions, which gave rise to parallax errors. More particularly, a conventional two-dimensional measurement of the spatial location of a detected gamma ray absorption event in the scintillating crystal is limited to a two-dimensional point in the X, Y plane of the crystal. However, because the number of scintillation photons reaching each photodetector element is dependent on the solid angle subtended by the area of that detector element to the point of the gamma ray absorption within the crystal, the amount of scintillation photons received by each detector is also a function of the depth of interaction (DOI) of the incident gamma ray within the crystal, i.e., along the Z axis of the crystal.

The DOI is an important parameter when applied to imaging detector geometries where the directions from which incident gamma rays impinge upon the crystal are not all substantially normal to the crystal surface. If incident gamma rays intersect the crystal from directions not normal to the crystal, the unknown depth of interaction of those gamma rays within the crystal will result in an additional uncertainty in the measured position of the interaction because of the parallax effect, if only a two dimensional (i.e., X, Y) spatial location is calculated for such an absorption event. A detailed explanation of the importance of and the problems associated with the DOI is provided in "Maximum Likelihood Positioning in the Scintillation Camera Using Depth of Interaction," D. Gagnon et al., IEEE Transactions on Medical Imaging, Vol. 12, No. 1, March 1993, pp. 101-107, incorporated herein by reference.

Thus, it is desirable to provide a gamma detector that has the relative simplicity of construction of a monolithic crystal detector but that affords the improved resolution associated with a pixelated gamma detector. Moreover, such a detector suitably is configured such that parallax errors could be reduced by using depth of interaction (DOI) information to increase the spatial resolution of the system, i.e., to provide the location of gamma interaction in three dimensions in space.

SUMMARY OF THE INVENTION

A scintillation detector according to an embodiment of the invention features a monolithic scintillation crystal and a plurality of optical fibers coupled to the scintillation crystal. The optical fibers are arranged to convey scintillation light to an optical sensor that is located exterior to the scintillation crystal. Because the optical fibers are extremely small in diameter—in particular, smaller than PMT's or APD's—a multiplicity of them can be coupled to the scintillation crystal to provide the extremely high resolution of a pixelated scintillation crystal while the comparative manufacturing simplicity of a monolithic scintillation crystal is maintained. In preferred embodiments, the optical fibers are further arranged so that depth of interaction information can be obtained.

BRIEF DESCRIPTION OF THE DRAWINGS

Embodiments of the invention will become more clearly understood from the following detailed description in connection with the accompanying drawings, in which.

DETAILED DESCRIPTION OF THE EXEMPLARY EMBODIMENT

Figure 1:
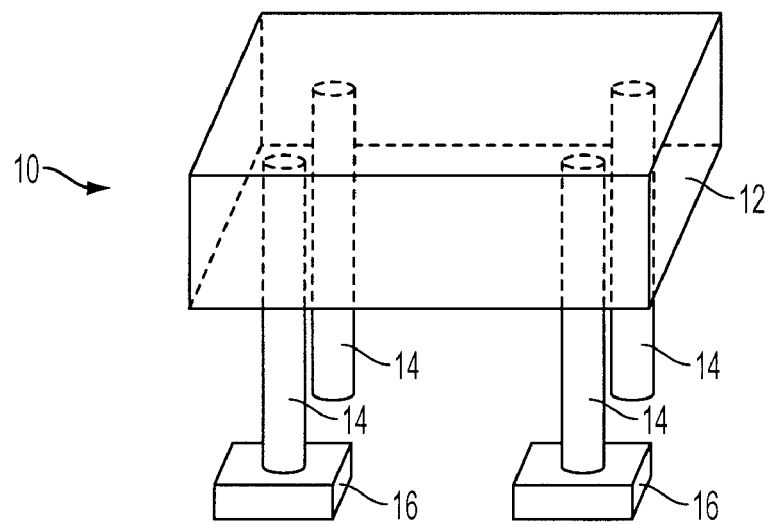
FIG. 1 is a schematic perspective view of a first embodiment of a scintillation detector.

A first, embodiment 10 of a scintillation detector is illustrated in FIG. 1. The detector 10 includes a monolithic scintillation crystal 12 that comprises any suitable material that scintillates in response to a gamma absorption event, e.g., NaI(TI), LSO, GSO, BGO, etc. A plurality (e.g., four as illustrated, but at least three) of light-conducting optical fibers 14 are coupled to the scintillation crystal 12 and extend outwardly from the crystal 12 to photosensors 16 (only two of four shown in FIG. 1), e.g., PMTs, APDs, or other types of photosensor devices, to which the optical fibers 14 are coupled. In the illustrated embodiment 10, light emitted from interaction with a gamma annihilation event that occurs anywhere within the scintillation crystal 12 will enter each of the optical fibers 14 and be transmitted to each of the associated photosensors 16. The relative X, Y location of the scintillation event within the plane of the photosensors 16 then can be determined based on the relative intensity of the light sensed by each of the photosensors 16, i.e., by "triangulation" or mathematical computation. (This is why a minimum of three optical fibers 14 are necessary.)

In the embodiment 10 illustrated in FIG. 1, the optical fibers 14 are coupled to the scintillation crystal 12 by virtue of input end portions of the fibers 14 being embedded within the scintillation crystal 12. In such instance, the embedded input end portions of the optical fibers are suitably unclad or roughened so that light may enter the fibers most easily, whereas the portions of the optical fibers that are exterior to the scintillation crystal 12 are suitably clad so as to promote transmission of light along the fibers to the photosensors 16.

Furthermore, the end portions of the optical fibers 14 may be embedded by pre-forming cavities using high-temperature materials around which the crystal is grown; alternatively, very small cavities may be formed in the scintillation crystal 12 after it is manufactured, e.g., by laser drilling or mechanical drilling, and the ends of the optical fibers inserted into and fixed within the cavities, e.g., using optically transmissive adhesive.

Alternatively, to reduce the loss of sensitivity that may result from the presence of cavities within the scintillation crystal 12, which may particularly arise if a relatively large number of optical fibers 14 is used (which increases resolution capability of the detector), one may suitably attach the ends of the optical fibers 14 directly to the surface of the scintillation crystal 12.

Furthermore, in yet another variation that may be employed in the embodiment 10 illustrated in FIG. 1 or in any of the other embodiments described below, the optical fibers may be wave- or frequency-shifting such that the light transmitted by the fibers is adjusted to better match the photo-response frequency of the associated photosensors (e.g., APDs tend to respond better to more green-shifted light than PMTs, which tend to respond better to light that is in the violet range).

Figure 2:
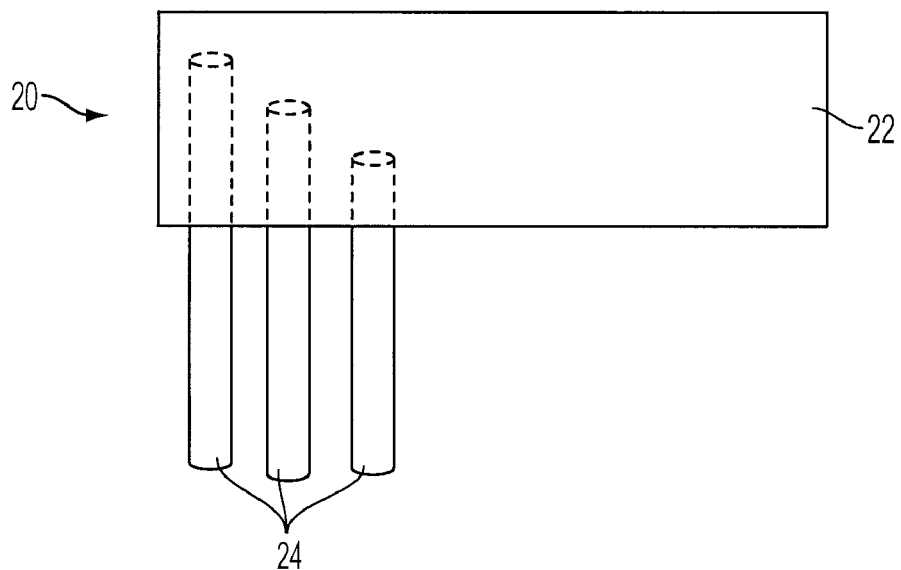
FIG. 2 is a schematic side view of a second embodiment of a scintillation detector.

In another embodiment 20 illustrated in FIG. 2, optical fibers 24, each coupled to a photosensor (not shown), may be embedded within a monolithic scintillation crystal 22. In this embodiment 20, the optical fibers 24 are suitably different lengths, with upper ends (as shown in the Figure) extending into the scintillation crystal 22 to different extents and lower ends (as shown in the Figure) essentially aligned. Alternatively, the optical fibers 24 may all have the same length, but still extend into the scintillation crystal 22 to different extents. By sensing which optical fiber 24 carries the strongest light signal, and knowing the depth of penetration (and, if necessary, the relative X-Y spacing) of the various fibers, one may ascertain the depth of interaction (DOI) information for any given scintillation event. These variant-length optical fibers 24 may constitute a set of fibers that is supplemental to a set of equal-length, equal-depth-of-penetration fibers such as those illustrated in FIG. 1, or they may constitute the entire set of optical fibers. The former case, however, should afford more simple calculation to determine the location in X-Y-Z space of any given scintillation event.

Figure 3:
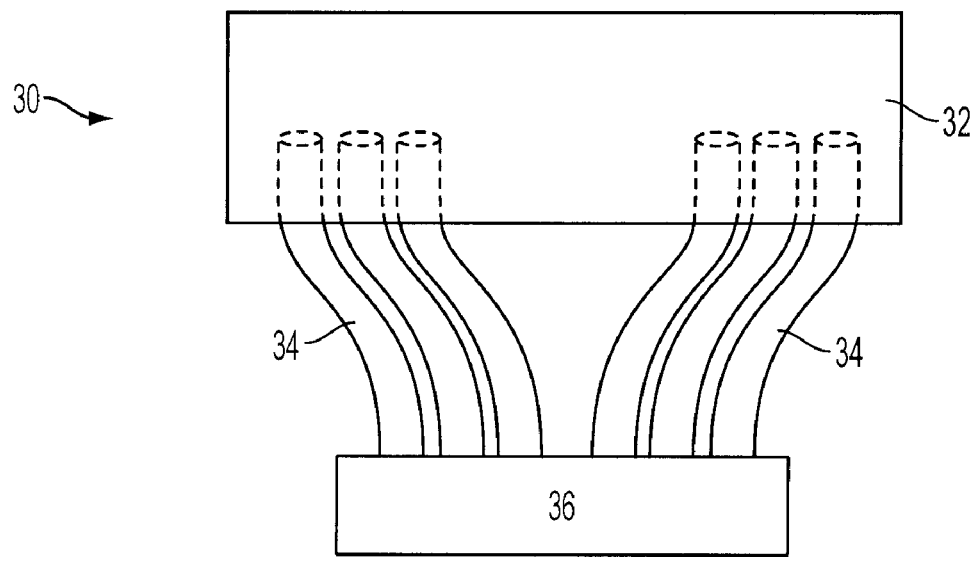
FIG. 3 is a schematic side view of a third embodiment of a scintillation detector.

In the embodiments 10 and 20 illustrated above, the optical fibers 14, 24 are generally straight, which suggests that the associated photosensors will occupy the same amount of lateral space (X-Y) as the scintillation crystals 12, 22. Given the relative flexibility of optical fibers, however, the fibers can be bent, twisted, or bundled together such that a large number of them, coupled to a fairly extensive scintillation crystal 32 as shown in FIG. 3, can be coupled to photosensors (or a single, position-sensitive photosensor 36, as shown) that, in toto, occupy less lateral space than the scintillation crystal 32. Thus, the use of optical fibers to "read out" the light from a scintillation crystal allows a generally smaller detector unit to be constructed than is typically the case with photosensors that are coupled directly to the scintillation crystal.

Figure 4:
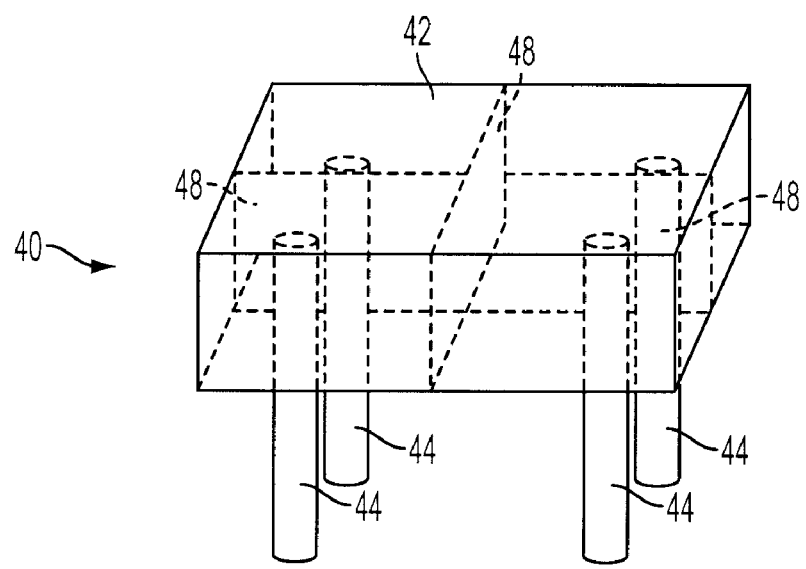
FIG. 4 is a schematic perspective view of a fourth embodiment of a scintillation detector.

In the embodiments described above, "triangulation" using the relative intensities of light transmitted by each of the optical fibers is used to ascertain the X-Y (and Z) location of each scintillation event. In a fourth embodiment 40 illustrated in FIG. 4, the capacity to differentiate amongst the various optical fibers 44 into which light enters is enhanced. In particular, as illustrated, the scintillation crystal 42 has internal optical partitions 48 between the various optical fibers to help direct the scintillation light emitted at any given location within the crystal 42 into the associated optical fiber 44 (and hence into an associated photosensor (not shown)). The partitions may be formed by laser techniques, such as described in copending application Ser. No. 10/856,225 filed May 28, 2004 entitled "Method for Fabrication of a Detector Component Using Laser Technology," incorporated herein by reference.

Figure 5:
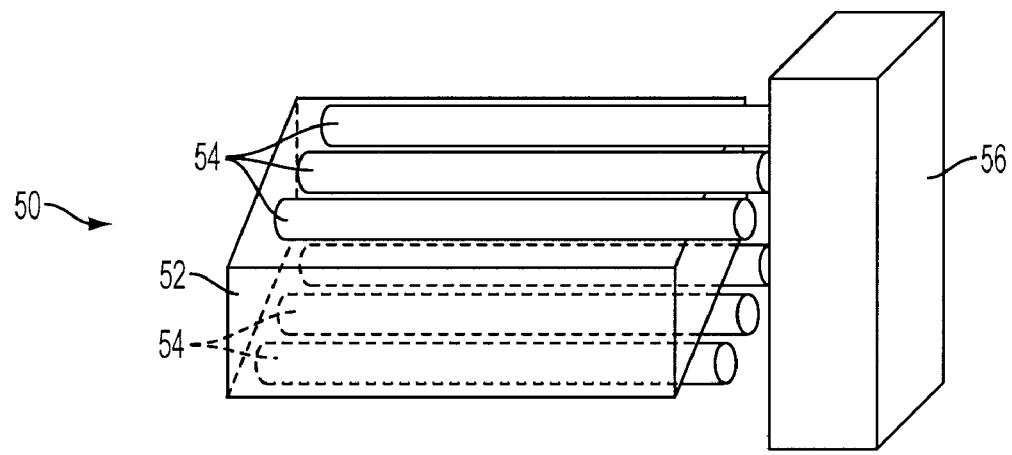
FIG. 5 is a schematic perspective view of a fifth embodiment of a scintillation detector.
Figure 6:
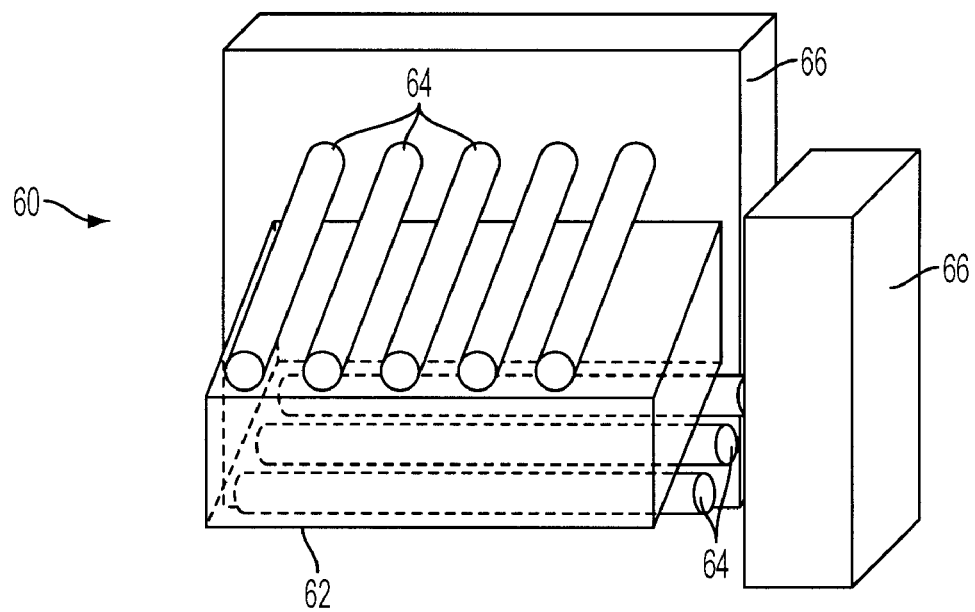
FIG. 6 is a schematic perspective view of a sixth embodiment of a scintillation detector.

In an alternate mode of construction which may be somewhat easier to fabricate than the embodiments illustrated above, which alternate mode is illustrated by the embodiments 50 and 60 shown in FIGS. 5 and 6, respectively, the optical fibers may be aligned with and coupled in parallel relation to the surfaces of the scintillation crystal instead of generally perpendicular to them.

For example, as illustrated in FIG. 5, optical fibers 54 may be aligned parallel to each other and coupled in parallel relation to the radiation receiving surfaces of a scintillation crystal 52, with the fibers 54 on opposite surfaces of the scintillation crystal 52 also being parallel to each other. In this embodiment, the fibers all may be coupled to a single photosensor 56, if desired. Because this embodiment relies on light entering the fibers 54 from the sides thereof, the portions of the fibers which are coupled to the surfaces of the scintillation crystal are suitably unclad, whereas the remainder of the lengths of the fibers are suitably clad to facilitate light propagation to the photosensor(s) 56.

Similarly, in the embodiment 60 illustrated in FIG. 6, the optical fibers 64 are aligned with and coupled in parallel relation to the radiation receiving surfaces of the scintillation crystal 62 instead of being oriented perpendicular to such surfaces as in FIGS. 1-4. In this embodiment, the optical fibers 64 coupled to one surface of the scintillation crystal 62 are orthogonal to the optical fibers 64 coupled to the opposite surface of the scintillation crystal 62. As shown, the fibers coupled to one surface may be coupled to a first common position-sensitive photosensor 66 and the fibers coupled to the other surface may be coupled to a second common position-sensitive photosensor 66. Alternatively, the fibers on one or both surfaces may be bent at a 45° and coupled to a single, common position-sensitive photosensor that is oriented at the corner of the scintillation crystal 62.

This arrangement of the fibers provides strong capability to differentiate the X-Y position of a scintillation event within the crystal based on intensity of the light signals within the various fibers, with the fibers coupled to one surface being used to discern the X-position of the event and the fibers on the opposite surface being used to discern the Y-position of the event. The Z-position of the event can be ascertained based on the relative intensity of the light signals between the two different groups of fibers.

The foregoing description of an embodiment of the invention is for illustration purposes only. The scope of the invention is defined by the following claims.

What is claimed is:

1. A scintillation detector, comprising:
 a monolithic scintillation crystal;
 at least one photosensor; and
 a plurality of fiber optics optically coupled to said scintillation crystal and arranged to couple scintillation light from within said scintillation crystal to said at least one photosensor wherein ends of said fiber optics extend internally into said scintillation crystal.

2. The scintillation detector of claim 1, wherein each of said fiber optics is arranged to couple scintillation light to its own respective photosensor.

3. The scintillation detector of claim 1, wherein said plurality of fiber optics are arranged to couple scintillation light to a common, position-sensitive photosensor.

4. The scintillation detector of claim 1, wherein ends of said fiber optics extend internally into said scintillation crystal to varying extents.

5. The scintillation detector of claim 1, wherein the configuration of the scintillation crystal and the embedded optical fiber ends is the result of growing the scintillation crystal around high temperature material forming a cavity for insertion of optical fiber.

6. The scintillation detector of claim 1, wherein the ends of said fiber optics are inserted into holes that have been formed in said scintillation crystal after growth of said scintillation crystal.

7. The scintillation detector of claim 1, wherein said scintillation crystal has internal partitions between the ends of the fiber optics.

8. The scintillation detector of claim 1, wherein endmost surfaces of said optical fibers are coupled to a surface of said scintillation crystal.

9. The scintillation detector of claim 1, wherein said optical fibers extend generally perpendicular to the surface of the scintillation crystal through which they extend or to which they are coupled.

10. The scintillation detector of claim 1, wherein said optical fibers extend generally parallel to one or more surfaces of said scintillation crystal and said optical fibers are optically coupled to said one or more surfaces of said scintillation crystal by side surfaces of said optical fibers.

11. A scintillation detector, comprising:
 a monolithic scintillation crystal;
 at least one photosensor; and
 a plurality of fiber optics optically coupled to said scintillation crystal and arranged to couple scintillation light from within said scintillation crystal to said at least one photosensor, wherein optical fibers are optically coupled to opposite surfaces of said scintillation crystal.

12. The scintillation detector of claim 11, wherein the optical fibers that are coupled to one of said surfaces extend parallel to the optical fibers that are coupled to the opposite of said surfaces.

13. The scintillation detector of claim 12, wherein the optical fibers that are coupled to both of said opposite surfaces are optically coupled to a single common position-sensitive photosensor.

14. The scintillation detector of claim 11, wherein the optical fibers that are coupled to one of said opposite surfaces extend perpendicularly to the optical fibers that are coupled to the other of said opposite surfaces.

15. The scintillation detector of claim 14, wherein the optical fibers that are coupled to said one of said opposite surfaces are optically coupled to one common position-sensitive photosensor and the optical fibers that are coupled to the other of said opposite surfaces are optically coupled to a second common position sensitive photosensor.

* * * * *